Dec. 12, 1961  J. P. SWEENEY  3,013,108
APPARATUS FOR INSULATION AND COMPENSATION OF ELECTRICAL
CONDUCTORS FOR HIGH TEMPERATURE AMBIENT CONDITIONS
Filed Aug. 2, 1956  4 Sheets-Sheet 1
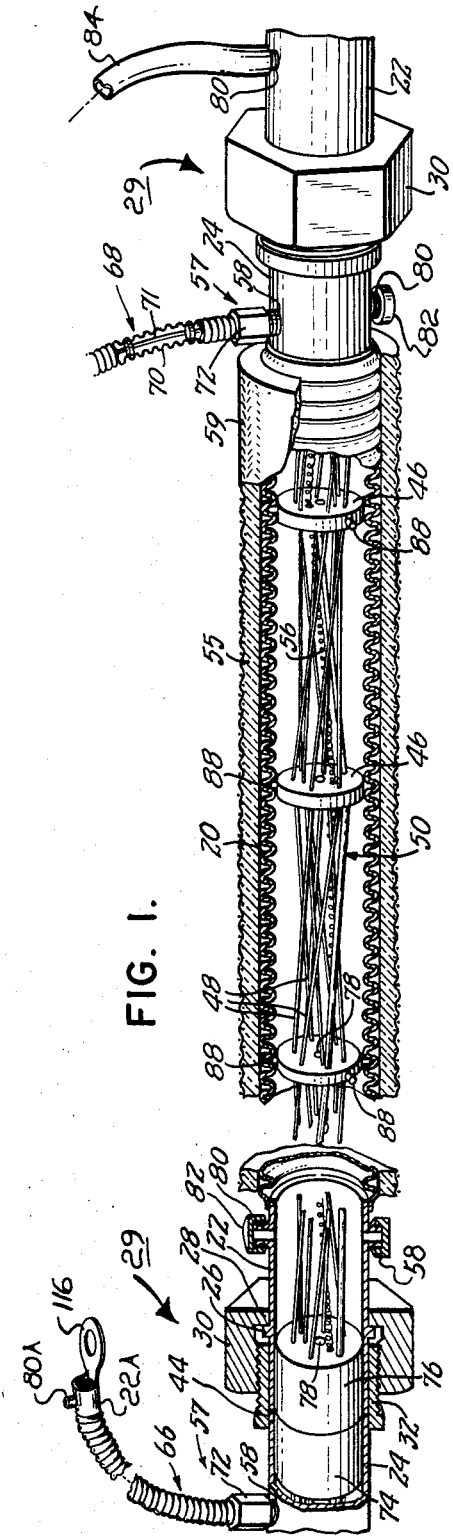
INVENTOR
JOSEPH P. SWEENEY
BY
Curtis, Morris & Safford.
ATTORNEYS Dec. 12, 1961 J. P. SWEENEY 3,013,108
APPARATUS FOR INSULATION AND COMPENSATION OF ELECTRICAL
CONDUCTORS FOR HIGH TEMPERATURE AMBIENT CONDITIONS
Filed Aug. 2, 1956 4 Sheets-Sheet 2
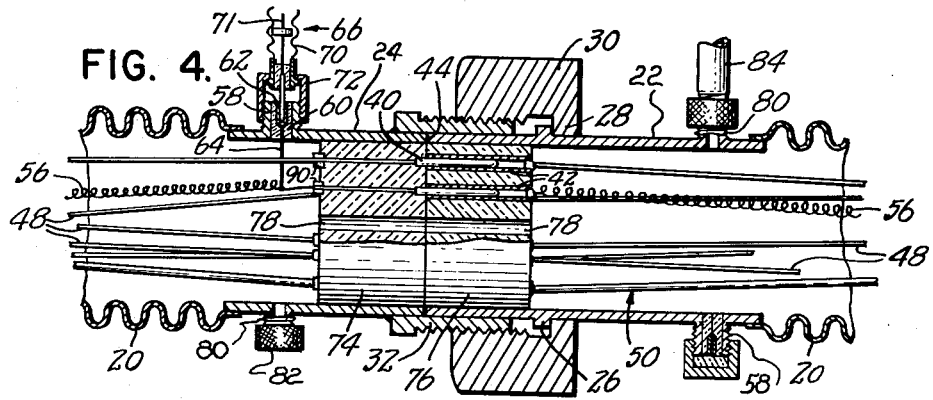
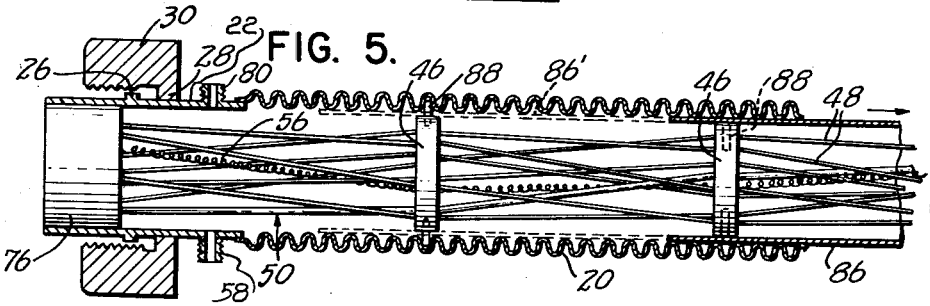
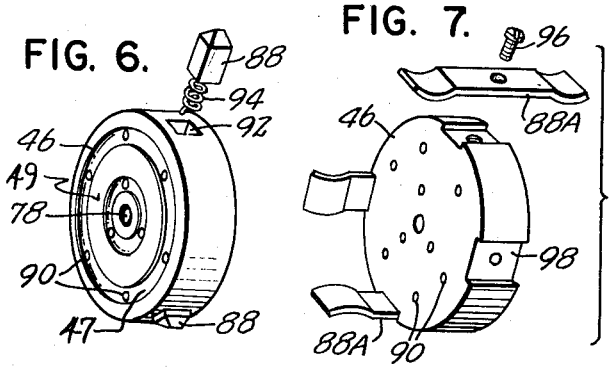
INVENTOR
JOSEPH P. SWEENEY
BY
Curtis, Morris & Safford
ATTORNEYS

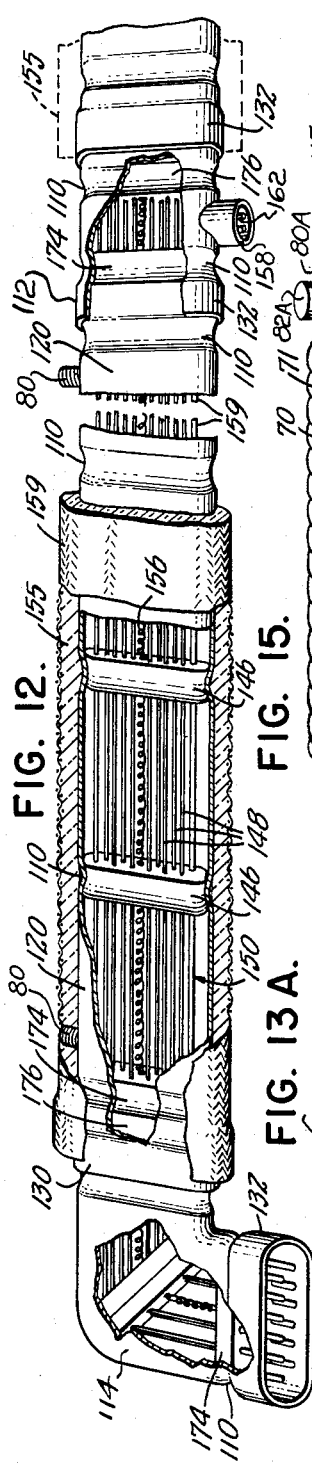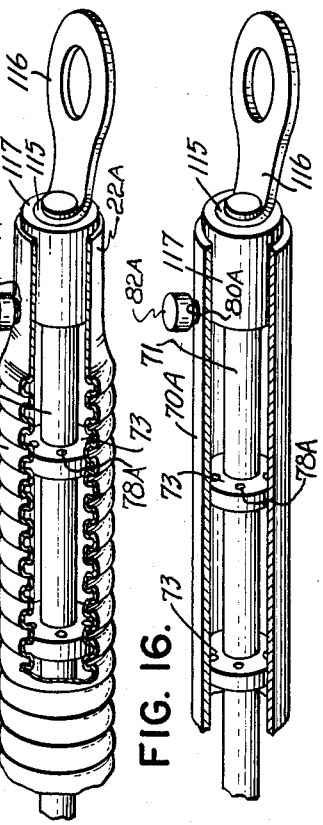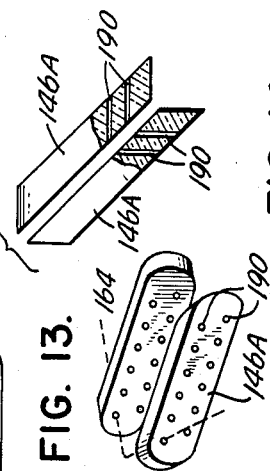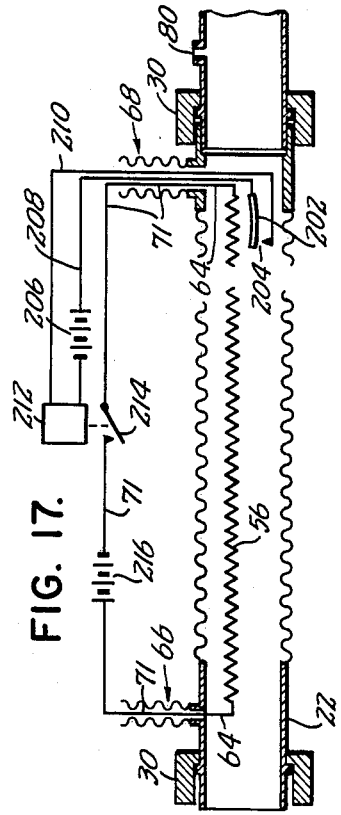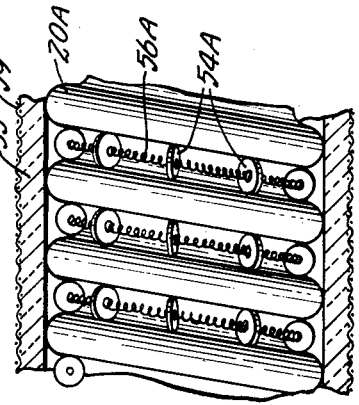

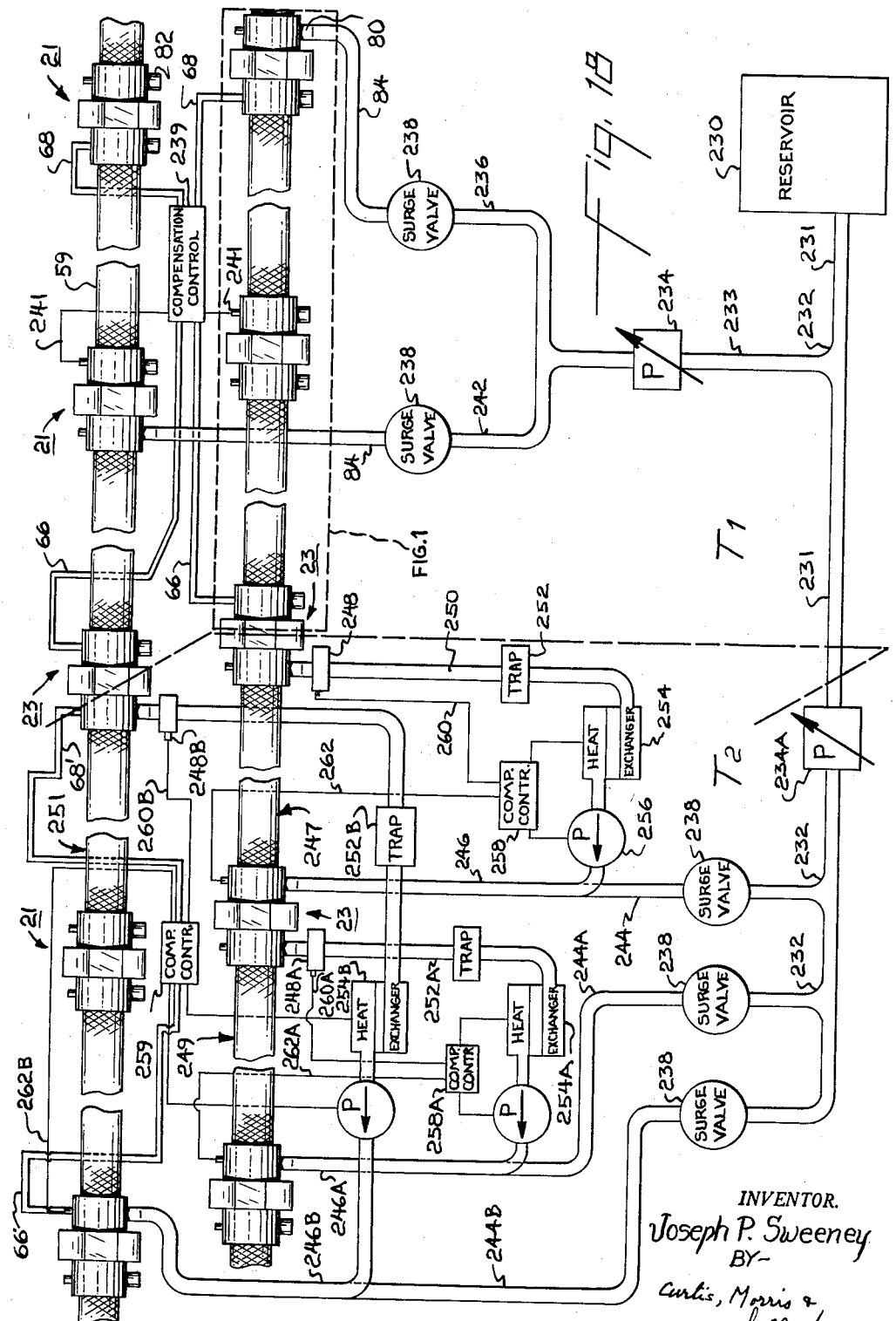

United States Patent Office 3,013,108
Patented Dec. 12, 1961

3,013,108
APPARATUS FOR INSULATION AND COMPENSATION OF ELECTRICAL CONDUCTORS FOR HIGH TEMPERATURE AMBIENT CONDITIONS
Joseph P. Sweeney, Harrisburg, Pa., assignor to AMP Incorporated, a corporation of New Jersey
Filed Aug. 2, 1956, Ser. No. 601,798
1 Claim. (Cl. 174—99)

The present invention relates to apparatus for insulation and compensation of electrical conductors for operation under high temperature ambient conditions. The pressurized electrical cables and assemblies described herein as illustrative embodiments of the present invention provide many advantages for use under high temperature ambient conditions, and are particularly well suited for operation where corrosive environments or low atmospheric pressures or both may be encountered in conjunction with the high temperature ambient conditions.

These advantages of the present invention become very important in applications where the ambient temperature exceeds 600° F. and are even more marked as the ambient temperature moves up into the range from approximately 800° F. to approximately 1500° F. The pressurized electrical cables and assemblies of the present invention have numerous advantages for use in both piloted and guided aircraft for high speed or high altitude operation, such as in jet aircraft, missiles, rockets, and the like.

As the ambient temperature begins to rise much above 600° F., even the very best of the conventional solid insulation materials used to insulate electric wires rapidly deteriorate, crumble, soften or melt, and lose their physical strength and dielectric properties. My experiments have shown that none of the conventional insulation materials for electric wires will operate in the temperature range from approximately 800° F. to approximately 1500° F.

Where corrosive environmental conditions are present at these elevated temperatures, for example, such as the corrosive effects of the atmosphere, conventional conducotrs, such as copper, aluminum, and brass, and the like rapidly corrode. In many instances, the layers of corrosion build up on the conductors so fast that they flake away and drop down into other portions of the electrical circuits causing electrical breakdown of the equipment. At the terminations and junctions of the conductors in a circuit, the layers of corrosion spread rapidly across the contact faces. These corrosion layers on the contact faces often cause interruptions in the circuit, that is, an "open" circuit condition quickly results. In many cases these corrosion layers produce unpredictable semi-conductor effects at terminations and junctions, similar to the rectifier action of a copper-oxide rectifier.

Other effects appear in this elevated temperature range causing difficulties in the operation of electrical circuits. For example, serious errors are introduced in circuits by the generation of spurious thermoelectric voltages resulting from differences in the temperature of different parts of the circuits. These effects are very serious in circuits such as those used for flight measurements and flight control in the operation of high speed or high altitude aircraft. Portions of the aircraft, such as near the nose and engine heat up more quickly than the remainder so that large temperature differences appear at different places in the electrical networks within the aircraft. Certain terminations and junctions begin operating at a much higher temperature than others; in effect "hot junctions" and "cold junctions" appear. Because of the Seebeck effect, voltages are generated within the measurement and control circuits of the aircraft in the same manner that voltage is generated in a thermocouple circuit. However, these voltages arising in the measurement and control circuits of the aircraft are variable and are practically unpredictable and seriously interfere with the functioning of the circuits. Erroneous measurements and control action are produced because of these spurious Seebeck-effect voltages, and the errors vary with changes in temperature differences at different points in the electrical circuits such as result from changes in speed, air density, engine power, and duration of flight.

In addition to this effect, spurious voltages are generated in electrical circuits at these elevated temperatures because of the presence of variations in temperatures along the lengths of the conductors, as a result of the Thomson effect. These voltages are also variable and are practically unpredictable, depending upon temperature gradients along a conductor and produce errors which change with variations in temperature during operation. Such errors are particularly critical when occurring in the flight measurement and control circuits of high speed aircraft.

In the illustrative embodiments of the present invention a dielectric gas or combination of gases inert within this temperature range advantageously provide insulation for the conductors and isolate the conductors from all corrosive environmental conditions. The conductors are assembled in spaced relationship within an impervious sheath formed from a material which withstands this elevated temperature range and withstands corrosive environments without significant corrosion. The dielectric gas completely fills the sheath, surrounding all of the conductors therein, and it provides highly desirable electrical insulation characteristics. This assures that no breakdown in the insulation occurs as a result of the elevated temperature range, for the dielectric gas is desirably unaffected by these temperatures.

Among the many advantages of the apparatus of the present invention are those resulting from the fact that conventional conductor materials are enabled to be used at the elevated temperature range from 600° F. to approximately 1500° F. and are isolated from all corrosive environmental conditions by the impervious sheath and the inert gas within the sheath.

A further advantage of the apparatus described herein is the flexibility provided in the sheath and conductor assembly. The spaced relationship of the conductors is arranged to enable flexing of the assembly while positively maintaining the individual connectors in their relative spaced positions.

Another important advantage of the illustrative embodiments of the present invention is the pressurization of the dielectric gas so as to maintain a desired minimum value, say, for example, at least 15 pounds per square inch pressure within the sheath. This advantage is of great importance for operation at low atmospheric pressures because of the reduction in arc-over voltage which occurs as the air pressure is reduced.

For example, consider electric circuits operating in an aircraft at progressively higher altitude; the atmospheric pressure continuously drops resulting in drastically reduced arc-over voltages at higher altitudes. Thus, at sea level it requires approximately 10,000 volts to cause a spark to jump across an eighth-inch gap air space; whereas, above 120,000 feet, the atmospheric pressure is so low that a few hundred volts will cause a spark to jump across the same gap. This problem is made more serious by the fact that in the presence of solid dielectric material in or near the gap, a spark can jump across at much lower voltages, such as forty or fifty volts, due to the presence of static charges which build up on the dielectric surface and cause progressive breakdown across the gap.

Advantageously, the pressurization of the inert gas within the protective sheath prevents any adverse effects resulting from pressure drop at high altitudes. The voltage breakdown strength between adjacent conductors and between each conductor and the supporting structure is maintained at least equal to the same safe value as occurs at sea level. A particular advantage of the illustrative embodiments of this invention as applied to aircraft is that the pressurization of the cable assemblies is independent of any pressurization of the aircraft fuselage. If for any reason the fuselage itself loses pressure, as from a ruptured port hole, the cable assemblies themselves maintain their internal pressure and so prevent any electrical breakdown due to loss of pressure.

Another important advantage of the apparatus described as illustrative embodiments of my invention is the extremely effective compensation obtained for high temperature ambient conditions. In certain cable assemblies as described, electrical resistance heating elements are provided. These heating elements are utilized prior to operation of the electrical circuits to heat all of the electrical conductors, junctions and terminations up uniformly to a predetermined high temperature. This predetermined value is related to the highest ambient temperature which will be encountered during operation, as explained in detail below. In this way, all Seebeck and Thomson effect voltages are minimized within tolerable limits and the circuits can all be suitably adjusted, i.e., "zeroed" in, prior to operation so as to produce the correct action during operation. Thereafter the heating elements are automatically controlled to maintain the electrical network uniformly at this predetermined temperature so as to maintain the circuits all properly in adjustment.

As the ambient temperature begins to rise, the amount of heat being supplied by the heating elements is correspondingly reduced so as to maintain all of the conductors, junctions and terminations at the same high temperature. As variations occur in the ambient conditions from place to place in the electrical components in these various places are correspondingly automatically varied to maintain the same high operating temperature throughout. For example, where this method and apparatus is utilized in an aircraft, these heating elements are all energized prior to flight. When all of the electrical components in the measurement and control circuits have been heated up to the desired operating temperature, then the various instruments and controls are adjusted to the proper condition. Thereafter, during flight the generation of spurious voltage is advantageously prevented by the automatic control of circuit temperature at the desired value.

Effective temperature compensation is provided in certain embodiments illustrative of my invention by circulation of the inert dielectric gases which fill the cable sheath. Each cable section is equipped with gas fittings or spuds at both ends and provision is made for the passage of gas between these spuds. By circulating the dielectric gas through the cable sections and through a suitable heat exchanger system, the temperature within the cable is automatically raised or lowered, as operating conditions require. For example, in an aircraft, one section of a cable might pass near the after section of a jet engine and be subjected to temperatures above the predetermined value to which it had been pre-heated electrically, as above. A pump is then set into motion to circulate the gas through the heat exchanger, thereby cooling the gas and maintaining the interior of the cable at the predetermined and desired operating temperature.

Another advantage of this circulating gas system lies in the fact that it enables the use of a suitable trap for the capture of impurities or condensation-produced moisture in the gases in the system. For example, corona causes some types of dielectric gases to dissociate into highly corrosive by-products. The trapping and elimination from the system of these by-products is desirable to extend the life of the system.

Another further advantage of the cable assemblies described herein which is valuable for all transportation and is most important in aircraft is their relatively light weight. In many installations, the methods and apparatus described enable considerable saving in weight to be effected when used in place of conventional electrical cables. The weight of the inert dielectric gas used for insulation and isolation is negligible and often more than offsets the weight of the impervious sheath, as compared with the weight of conventional solid insulation materials as now used on wires in aircraft. This weight reduction advantage becomes quite sizable in multi-conductor cables where a single sheath surrounds all of the conductors and the dielectric gas fills the spaces among the conductors and between the conductors and the sheath.

Among the many further advantages of the present invention are those arising from the fact that the cable assemblies can be flexible or rigid. In the flexible assemblies as shown herein the sheath has a corrugated wall and a protective braid overlies these corrugations. This braid reinforces the sheath for internal pressurization and advantageously provides a uniform outer diameter preventing any snagging when the cable assemblies are drawn through confined spaces during installation in a structure.

The cable assemblies described herein are in convenient lengths for installation purposes. Interconnection of one cable with another automatically provides an interconnection of electrical conductors and can also provide an interconnection of gas passages where desired while completely sealing up the sheath for pressurization.

In this specification and in the accompanying drawings, are described and shown a number of highly advantageous embodiments of my invention and various modifications thereof are indicated, but it is to be understood that these are not intended to be exhaustive nor limiting of the invention, but on the contrary are given for purposes of illustration in order that others skilled in the art may fully understand the highly effective methods and apparatus for insulation and compensation of electrical conductors for high temperature ambient conditions of the present invention and the manner of applying the methods and apparatus in practical use so that they may modify and adapt them in various forms, each as may be best suited to the conditions of a particular electrical conductor installation.

There are numerous other features and advantages of the present invention which I consider important and are explained in the following specification considered in conjunction with the accompanying drawings, in which:

FIGURE 1 is a perspective view, shown as partially cut away and partially in section, of portions of a pressurized flexible electrical cable assembly embodying the present invention and particularly well adapted for operation under very high temperature ambient conditions and which includes temperature compensation;

FIGURE 2 is a perspective view, shown enlarged and as partially cut away and in section, of a single conductor shielded cable which is incorporated within the cable assembly of FIGURE 1 and is electrically shielded from the other conductors within this cable assembly;

FIGURE 3 is an exploded perspective view, shown partially broken away and on enlarged scale, of a plug such as is located at one end of a section of the cable assembly of FIGURE 1 and of the mating socket and its coupling nut located on the adjacent end of the next section of the cable assembly;

FIGURE 4 is a longitudinal cross sectional view of the adjacent ends of two cable sections including the plug and socket as shown in FIGURE 3 and illustrated in tightly coupled relationship;

FIGURE 5 is a longitudinal sectional view of a portion of a cable assembly illustrating method and apparatus for easily and positively positioning and securing the various conductors and their ceramic insulating spacers within the corrugated flexible sheath;

FIGURES 6, 7, and 8 show three different types of ceramic insulating spacers for supporting several conductors in properly spaced relationship within a flexible sheath;

FIGURES 9, 10, and 11 illustrate various types of flexible metal sheaths for purposes of explanation;

FIGURE 12 is a perspective view, shown as partially cut away and partially in section, of portions of a pressurized rigid electrical cable assembly adapted for operation under very high temperature ambient conditions and which includes temperature compensation;

FIGURES 13 and 13A illustrate the ceramic spacers used at bends in the cable assembly;

FIGURE 14 shows a form of the cable assembly in which the temperature-compensation heating element surrounds the flexible sheath within a layer of heat insulating material and an outer flexible protective metal braid;

FIGURES 15 and 16 illustrate electrical conductors and connectors provided with pressurized flexible and rigid sheaths, respectively;

FIGURE 17 is used in connection with explanations of one embodiment of the temperature compensation methods and apparatus; and FIGURE 18 is used in connection with explantions of another embodiment of the temperature compensation methods and apparatus, and of the pressurization system.

As shown in FIGURE 1 the cable assembly includes an annularly corrugated thin-wall seamless metal sheath 20 of material which retains its strength, while avoiding brittleness, and which resists attack in corrosive environments, such as atmospheric gases at temperatures up to 1500° F. I find that an annularly corrugated seamless stainless steel flexible hose, such as can be obtained commercially from the American Metal Hose Company under the designation of #ST-2021, is exeremely well suited for many applications. In other applications, for example as shown in FIGURE 14, where a resistnce heating element is arranged around the sheath, a helically corrugated thin-wall seamless metal sheath of material having the above heat resistant and corrosion resistant characteristics can be used to advantage. Such a helically corrugated stainless steel sheath can be obtained commercially from Flexonics Corporation under the trade designation #RF-55. In some cases a lap wound or strip-wound stainless steel hose can be used, for example such as is obtained commercially from American Metal Hose Corporation under the designation of #LW 2021. I prefer the seamless sheath for most applications and in most instances find that the annularly corrugated sheath is most satisfactory.

In a nine-conductor cable assembly as shown in FIGURE 1, and adapted for pressurization at about sea-level pressure inside, the sheath 20 has a wall thickness of 0.01 inch. The internal diameter or clearance within the sheath is 1 inch with annular corrugations having a radial depth of 3/16 of an inch. The outside diameter is 1 3/8 inches.

At its ends the sheath is bonded by welding or brazing to short rigid shells 22 and 24, respectively, of the same material as the sheath and having internal diameters at least as large as the sheath. These shells 22 and 24 support the connectors for coupling adjacent sections of the conductor assembly together and also provide external lateral connectors for making intermediate gas and electrical connections to the interior of the cable, as explained further below.

Each section of the cable has a convenient length, here shown as being about three feet long, and the individual sections are joined together as desired, forming connections 21 and 23, as shown in FIGURES 1 and 18, to wire up an installation. For joining them together, each shell 22 at the socket ends of the cable sections includes a collar 26 rigidly welded thereon and engaged by an internal flange 28 of a coupling nut 30. The shells 24 at the plug ends of the cable sections include threaded sleeves 32 welded thereon and adapted to screw into the coupling nuts 30 and slide over the ends 34 of the shells 22 beyond the collars 26. An internal key 36 in each sleeve mates with an external keyway 38 on the shell end 34 and assures proper connection of the various individual electrical contacts, illustratively shown as prongs 40 which fit into the individual sockets 42.

In order to produce a gas-tight coupling, a stainless steel gasket 44 (see also FIGURE 4) is fitted inside the sleeve 32 and abuts against the shell end 34 when the coupling nut is drawn up snugly.

Extending between the electrical contacts 40 and the corresponding contacts 42 at the other end of each cable section are shown eight conductors plus a compensation resistance heating element supported by insulating spacers 46 (shown in detail in FIGURES 6 and 7) in a symmetrical concentric pattern. Three of them are arranged in an equilateral triangular pattern near the axis of the cable section and six are grouped concentrically around them. Seven of these conductors 48 are bare solid wires of suitable conductive material, such as copper. Another solid conductor 49 (see also FIGURE 2) is arranged as the inner conductor of a shielded wire assembly 50.

This shielded wire assembly has an outer conductive shield braid 52 which electrostatically shields the inner conductor 49 from the other wires. A series of small insulating spacers 54 held in position by brazed spots, or other suitable means, along the inner conductor 49 support it concentrically within the shielding. Any number of these electrostatically shielded units 50 may be substituted for an identical number of bare conductors 48 where the isolation of each of these conductors from one another and from the non-shielded conductors 48 is desired.

This invention desirably enables a wide range of conductive material to be used for the conductors 48 and 49. In most cases copper or aluminum is used. But by virtue of the inert dielectric gas filling, many other materials can be used where their properties are required, for example, such as alloys of copper and aluminum, iron and iron alloys, silver and its alloys, nickel and its alloys, gold, and platinum.

In order to withstand temperatures from 600° F. up to 1500° F. the main spacers 46 within the flexible sheath and the small spacers 54 for the shielded wire assembly are formed from ceramic materials having the desired electrical and mechanical properties throughout the temperature range, including strength under vibration stresses. For example, I find that alumina or steatite, which is available commercially from the American Lava Corporation, Chattanooga 5, Tennessee, have the desired properties. It is preferable to pick a steatite material maintaining a high resistance value at elevated temperatures as set forth in Chart No. 551 of "Al Si Mag" ceramics, distributed by the American Lava Corporation.

For the purpose of pre-heating the cable assembly up to and automatically maintaining it at a predetermined temperature, a compensation resistance heating element 56 is included within each cable section. In installations where the dielectric gases are non-externally circulated, this predetermined value is the highest ambient temperature experienced in operation. In installations where the dielectric gas or gases are circulated externally through a gas hose 84 as shown in FIGURE 1 in a system as shown in FIGURE 18, the predetermined temperature used for compensation purposes is often below the maximum ambient temperature encountered during operation.

As shown most clearly in FIGURE 4 each of these heating elements has a prong 40 at one end which makes contact with a corresponding socket 42 in the next cable section, forming a continuous heating element extending the full length of the cable assembly. The resistance element 56 is a nickel alloy resistance wire, such as Nichrome. An insulation blanket 55 approximately 1/4 inch thick surrounds the sheath 20 to retain the heat during the pre-heating operation and maintains a more uniform temperature within the cable. The blanket is made of glass or ceramic fibre, such as the "Fiberfrax" ceramic material commercially available from the Carborundum Company, Niagara Falls, New York. A protective reinforcing braid 59 of the same material as the sheath overlies this insulation blanket. This protective braid strengthens the sheath for internal pressurization up to 200 p.s.i. and provides a smooth exterior surface for pulling the cable assembly through confined spaces without snagging.

In order to enable suitable energization of this heating element as desired, each shell 24 includes a heater connection 57 formed by a threaded lateral socket sleeve 58 housing a gas-tight insulating bushing 60 of the same ceramic material as the spacers 46, including a socket contact 62 electrically connected to the heating element 56 by a short transverse lead 64. In operation, as shown in FIGURE 1, pairs of heater energizing wires 66 and 68 are fastened onto selected pairs of the heater connections 57 and the heating current turned on and automatically controlled to maintain a uniform temperature along the cable length. As shown on an enlarged scale in FIGURE 15, these wires 66 and 68 include small flexible convoluted seamless sheaths 70 of the same material as the sheaths 20. A conductor 71 axially positioned within each sheath carries the heater current. This conductor 71 is supported by ceramic spacers 73 similar to those in the shielded wire 50. These spacers are spot brazed or otherwise fixed to spaced points along the conductor 71 to hold them in place. Conductor 71 becomes connected by a prong (FIGURE 4) with the contact socket 62, when the small coupling nut 72 is screwed onto the sleeve 58. In some installations one of the conductors 48 is used as the return circuit for the heater current, in place of one or more of the external wires 66 or 68.

As seen best in FIGURE 4 the individual contact prongs 40 and sockets 42 are held in place within the connector shells by insulating supports 74 and 76, respectively. The prongs and sockets are secured in place in the supports, which are of a suitable ceramic material as described above. An axial passage 78 passes through each of these supports similar to those through all of the spacers 46 (as described below) to joint the interiors of connecting cable assemblies and permit the circulation of the inert dielectric gas through the connections 21. The connections 23 (FIGURE 18) are identical with these connections 21 except that the ceramic supports 74 and 76 form dead-ended gas-tight section terminations, for example, to separate different gas circulation zones as described in detail further below.

The interior of the shielded assembly 50 communicates with the interior of the sheath 20 through the numerous small openings among the fine braided wires which make up the shielding 52, as seen in FIGURES 1, 2, 4, and 5.

For filling the sheaths of a completed cable assembly with a suitable inert gas, such as nitrogen, sulfur-hexafluoride, Freon ($CCl_2F_2$), or argon, each of the shells 22 or 22A includes a lateral spud 80, as shown in FIGURES 1, 3, 4, 12, 15, 16, and 18. These spuds open into the interiors of the shells and thus communicate with the entire interior of their cable sections. A cap 82 is normally screwed over the unconnected spuds. It is removed, as shown in FIGURES 3 and 4, during the filling and purging out of the air.

Usually it is most convenient to couple a gas tube 84 (FIGURE 4) to one of the spuds near the middle of the cable assembly. A pair of caps are then unscrewed at the ends of the assembly. In this way the inert dielectric gas purges the air out of each end of the cable. When the purging operation has been completed the caps at the ends of the cable assembly are replaced, the center or inlet connection being maintained. This allows the desired gas pressure to be built up within the assembly, and has the additional advantage of keeping the feed line and other components of the gas system away from the ends of the cable where they might interfere with the electrical connections or equipment. (Other details of the gas and pressurization system are discussed below in connection with FIGURE 18.)

FIGURE 5 illustrates method and apparatus for assembling flexible cable sections such as are shown in FIGURES 1 and 18. The ends of the individual conductors 48 and the resistance element 56 are first brazed or crimped to the rear or inner ends of their contact sockets 42 at the rear face of the ceramic support 76. The conductors and resistance element are threaded through the spacers 46 which are held in properly spaced positions. In certain instances the spacers are held in position with respect to the conductors by spot brazing. Where more than one ring of conductors is included the spacers are held by counter-spiralling of the conductors of the respective layers as described in detail below. Then a thin assembling tube 86 is slid over the spacers, depressing the locking detents 88 projecting from the rim of each spacer. A shell 22 and sheath 20 are next slid into position over the assembling tube, with the end of the shell being secured to the outside of the ceramic support 76 and with the sheath extending back along the length of the assembling tube 86, as indicated by the broken line position 86' of the assembling tube.

Then the assembling tube is drawn out as shown by the arrow from within the sheath. As the end of the assembling tube passes by each spacer, the individual locking detents 88 are released and spring out. They permanently engage in the corrugations of the sheath, locking each spacer in the desired position.

As the next-to-last step in the assembly, the conductors and resistance element are individually secured (see FIGURE 4) at 90 to the contact prong leads at the rear face of the support 74. In many assemblies it is advantageous to secure the conductors to the contacts by crimping. Where a dead-end gas-tight cable termination 23 is desired, for example to isolate various heating and cooling zones as described in detail in connection with FIGURE 18, the conductors and contacts are secured by brazing. As a final step, the shell 24 is fitted around the support 74 and secured to the end of the sheath 20 by welding or brazing.

Another convenient final assembly procedure which can be used instead of both the last two steps above utilizes a shell 24 and a sheath 20 which have previously been welded together. In this case the ends of the conductors and resistance element are pushed out through the appropriate holes in the support 74 which is secured within the shell 24. The projecting ends of the conductors and resistance element are cut off to the proper length and secured within their tubular contact prongs 40.

In order to enable bending of the cable assembly in any direction while minimizing any tendency to stretch or slacken the individual conductors, the conductors in each layer are arranged in a spiral pattern. In this way, each of the conductors occupies all of the relative positions in its layer. When the cable is bent along a curve, each of the conductors is thus exposed to the elongation and contraction action which occurs at the outside and inside of the bend, respectively. As a result, stresses are equalized. None of the conductors is stretched and none is allowed to slacken and droop down into contact with the sheath or with other conductors.

If the conductors were allowed to lie straight and parallel within the sheath, then this stretching and sagging might occur during flexing of the cable assembly.

Where only a single layer of conductors is included, such as six arranged in a circular pattern, or where only a few conductors are present, then the spacers 46 are held in place by spot brazing or otherwise fixing them to the conductors. Thus there is no tendency for the spacers to slide along the conductors while the assembling tube 86 is slid over them and later pulled off. Where six or fewer conductors are present they are usually all spiralled in the same direction by successively twisting each spacer with respect to the preceding one.

Where a greater number of conductors are present and they are arranged in more than one layer, the conductors are spiralled in opposite directions in the various layers. This has the advantage of preventing any sliding of the spacers bodily along the conductors without their being secured to the conductors.

It is desirable to select a conductor material having a co-efficient of expansion corresponding reasonably closely with that of the sheath, for example copper wires in a stainless steel sheath work very well.

FIGURES 6, 7, and 8 show three forms of ceramic spacers 46, with the axial passage 78 for the circulation of gases and two rings of holes 90 each for the two layers of conductors. FIGURES 6 and 7 are shown with an inner ring of three holes and an outer ring of six holes, which is the same configuration shown in FIGURE 1. FIGURE 8 shows an inner ring of six holes and an outer ring of twelve holes. In cable assemblies of different sizes and ratings, various configurations and numbers of holes 90 are used in accordance with this specification.

The spacer in FIGURE 6 is shown equipped with locking detents 88 which fit into corresponding recesses 92 in the rim of the spacer. The outer end of the detent is designed to engage between the interior convolutions of the sheath 20. Each detent is urged out radially by a spring 94 bearing against the bottom of the recess 92. Both the spring and the detent 88 are made of the same material as the sheath to minimize any tendency for galvanic corrosion. FIGURE 6 also shows the holes 90 located within recesses 47 which are separated by the ridge 49. The ridge effectively lengthens the surface path-length between conductors of the different rings thereby reducing the possibility of arc-over which otherwise might result from the build-up of a surface charge on the face of the dielectric.

In FIGURE 7 a modified form of locking detent 88A is shown. It is shaped like a leaf-spring, with ends curled out suitable to engage the convolutions of the sheath. These leaf-spring detents are secured at their centers by machine screws 96, fitting into notches in the rim of the spacer. Both the detents 88A and the screws 96 are made from the same material as the sheath.

In the modified form of spacer shown in FIGURE 8, the rim has a groove 100 accommodating a rippled detent spring 88B of the same material as the sheath. When released by withdrawing the assembling tube 86, the ridges in the detent 88B spring outwardly and lock between the sheath corrugations.

FIGURE 9 illustrates an annularly corrugated or convoluted thin-walled seamless flexible sheat 20 of temperature and corrosion resistant metal, such as the stainless steel described above. FIGURE 10 shows a helically corrugated sheath 20A of the same material. The sheath 20B shown in FIGURE 11 is of the same material, lap wound. The over-lapping edges of the winding are interlocked and tightly rolled together so as to resist gas leakage from within the sheath.

The modified form of multi-conductor cable assembly shown in FIGURE 12 is generally similar to that described above. Parts performing functions generally corresponding to those parts in FIGURES 1 to 6 have the same reference numbers increased by 100. There are also certain important differences described below. Each section includes a rigid seamless thin-walled sheath 120 of a corrosion resistant metal such as stainless steel. The sheath has an oval cross-sectional shape and is formed in convenient lengths, such as three feet. The conductors 148 lie parallel and are supported by oval ceramic spacers 146. To secure the spacers within the sheath, their perimeters are grooved, and the sheat is indented at spaced intervals 110 to fit these grooves. A compensation heating element 156 extends through the sheath near its axis. Surrounding the sheath is an insulation blanket 155 approximately ¼ inch thick covered with a reinforcing braid 159 of the same material as the sheath.

For connecting the sections of the cable assembly together, the prong end of each section is enlarged slightly to form a sleeve 132 adapted to slip over the end of the next section. A ceramic support 174 for the contact prongs 140 is held near the enlarged sleeve portion 132 of the sheath by an indentation 110. Similarly, an indentation at the other end of the sheath holds a ceramic support 176 for the individual contact sockets adapted to mate with the prongs 140 of the next cable section. When plugged together, the socket end of one sheath slides into the enlarged sleeve 132 of the next sheath. The joint is made gas tight by a bond between sheaths as formed by brazing or welding them together.

In order to fill the sheath of each cable section with dielectric gas, a spud or nipple 80 is provided at each end including a pressure retaining valve formed of ceramic or corrosion resistant metal parts. The holes through the spacers 146 are slightly larger than the diameters of the conductors so that gas communication throughout each cable section is provided.

Wherever a lateral electrical connection is desired, a short T-section connector 112 is used, as shown at the right in FIGURE 12. An installation is made by plugging the T-connector into the end of a cable section and plugging the next cable section into it. This T-connector includes a lateral sleeve 158 with one or more contacts 162 therein. These contacts 162 are connected to various ones of the conductors 148 or to the compensation heating element 156 as desired. These lateral connections are made during manufacture, and the various T-connectors 112 are suitably code marked to indicate the connections.

Various angle connectors are used to form the bends in an electrical installation. For example, a 90° angle connector 114 is shown at the left in FIGURE 12. The conductors are supported at the bend by a pair of suitably mitered ceramic supports 146A as shown in FIGURES 13 and 13A. As indicated by the dotted line in FIGURE 13 the conductors are run through aligned openings 190 in making a bend. Other convenient angles, such as 30°, 45°, and 60° are provided.

The cable assembly of FIGURE 14 is identical to that shown in FIGURES 1 to 6 except that the compensating heating element 56A is helically wound around the outside of the sheath 20A having helical convolutions. A series of small ceramic spacer grommets 54A support the resistance element 56A between convolutions. An insulation blanket 55 and protective metal braid 59 surround the assembly. The Nichrome material forming the resistance element 56A resists corrosion when exposed to the atmosphere at tempratures up to and above 1500° F. In certain instances to conserve space within the sheath it is desirable to arrange the element outside as shown.

FIGURE 15 illustrates, on an enlarged scale, an electrical termination for the other end of an insulated wire such as appears at 66 or 68 in FIGURES 1 and 4. The conductor 71 is supported by spacers 73 within the flexible sheath 70. The spacers are held in position by spots of brazing along the conductor 71 and are bored to provide one or more axial passages 78A each for the circulation of the gas. At its end, the conductor is joined to the ferrule portion 115 of a suitable terminating connector, shown as a ring-tongue terminal 116. A corrosion resistant material such as stainless steel is used to form this connector which may be exposed to the atmosphere. The end of the flexible sheath 70 is brazed or otherwise bonded to one end of a tubular piece 22A made of the same material as the sheath. The other end of this tubular piece 22A is bonded to a ceramic support 117. The interior surface of this support is bonded to the terminal ferrule 115 and the ceramic material of the support serves to insulate the ferrule from the tubing or the sheath. Inert gas fills the space within the sheath of this assembly and is supplied through the spud or nipple 80A mounted on the tubing 22A or through a similar fitting provided at the other end of the assembly.

FIGURE 16 illustrates, on a similarly enlarged scale, an electrical termination for an insulated wire similar to that shown in FIGURE 15 except that the sheath 70A is entirely tubular in form and consequently is less flexible. This sheath 70A provides the advantage of a reduced outside diameter while providing the same current capacity and voltage rating for the wire.

In order to provide compensation for the various thermoelectric effects methods and apparatus are used as shown diagrammatically in FIGURES 17 and 18. In certain cable assemblies this compensation is provided by compensating electrical heating elements. In other cable sections this compensation is provided by controlling the temperature of the dielectric gas as it is circulated through the cable sheath as described in connection with FIGURES 1 and 18. To control the energization of the compensating heating elements within cable sections in an installation, methods and apparatus are utilized as diagrammatically illustrated in FIGURE 17. A bi-metallic thermostat switch 202 is positioned to sense the cable sheath 20. It maintains the internal temperature of the sheath within a relatively few degrees of a predetermined value. In many applications this predetermined value is approximately equal to the maximum ambient temperature encountered in operation. In installations where controlled flow of the dielectric gas through the cable sheaths is used, this predetermined value is often established at a temperature below the highest ambient temperature encountered. Portions of the cable assembly are then cooled down to this value while other portions are heated up to it. Where the dielectric gas within the cable is of such a nature that it might dissociate in the presence of an electric arc produced by the breaking of the contacts 204, a thermocouple relay, with one junction positioned to sense the cable temperatures, can be employed in place of the bimetallic switch 202.

In the system schematically illustrated in FIGURE 17, this predetermined value selected for compensation corresponds with the maximum ambient temperature experienced during operation. The bi-metallic strip 202 opens and closes a pair of contacts 204. They control the current flow from a current source 206 through a pair of leads 208 and 210 to a relay winding 212. The winding 212 in turn moves an armature 214 to control the electrical power delivered from a source 126 through the conductors 71 and through the short leads 64 to the resistance heating element 56. The thermostat 202 is placed at a point along the cable assembly which has a temperature accurately representative of the temperature at all points along the length of the cable which is controlled by it. Other thermostatic switches are similarly positioned accurately to sense the temperature of other lengths of the cable installation which may be subjected to somewhat different ambient temperature conditions from the length shown here. In this way the internal temperatures of all of the cable sheaths are maintained constant regardless of varying ambient temperatures along various portions of the entire cable installation. For example, in an aircraft installation, various zones of the craft are selected, such as nose, mid-section, engine region, etc. Throughout each selected zone the ambient temperature is more or less uniform, although the temperatures of the various zones may vary widely with respect to each other. At least one thermostat 202 is located within each zone and controls the energization of the heating elements within all of the lengths of cable lying within its zone of control.

In the installation diagrammatically illustrated in FIGURE 18 are shown portions of a pair of cables formed by a plurality of cable sections coupled together at connections 21 and 23. The connections 21 provide gas flow between the adjacent cable sections, whereas the connections 23 are dead-ended for gas flow. These latter isolate the interiors of the adjacent cable sections from each other, thus enabling independent control of the gas flow in various sections of the cable.

The portions of the two cables shown extend through two zones of different ambient temperature during operation. The first zone $T_1$, shown at the right, has an ambient temperature below the predetermined value at which the interior of the cable is automatically maintained during operation. The second zone $T_2$, shown at the left, has an ambient temperature during operation substantially above this predetermined value. For convenience of illustration, the two zones $T_1$ and $T_2$ are shown as being generally separated by a plane passing therethrough approximately perpendicular to the plane of the drawing. As will be understood, in many cases the separation between such zones of different ambient temperatures is irregular, depending upon surrounding structure. For purposes of illustration, it is assumed that this is an aircraft installation and the zone $T_2$ is located near the side and afterburner part of a jet engine, while the zone $T_1$ is within the main fuselage ahead of a partition immediately in front of the hot parts of this engine.

Within the zone $T_1$, the area outlined by the dotted rectangle 1 corresponds with FIGURE 1, which is, of course, shown on a greatly enlarged scale. A protective shield braid 59 overlies the insulation layer surrounding all of the sheaths of the various sections of the two cables shown.

In order to supply an inert dielectric gas, as described above, to the interior of the cables a gas reservoir 230 is coupled through a main distribution hose 231 and through a T-connection 232 and by a branch line 233 to a pressure reducing and pressure control valve 234 for the zone $T_1$. A similar valve 234A is used for the zone $T_2$. These gas hoses, lines, and valves and all of the other parts described below for conveying the gas are made from the same material as used in the sheaths 20 for the cable sections.

The valves 234 and 234A reduce the pressure of the dielectric gas to a pressure at least as great as sea level atmospheric pressure. In many cases I prefer to use a pressure considerably above 15 p.s.i. with the dielectric gases listed above and with mixtures of them. The range from 50 to 200 p.s.i. is advantageous in an installation as shown. For example, with sulphur hexafluoride ($SF_6$) and with mixtures of gases including $SF_6$, such as a mixture of nitrogen and $SF_6$, there are advantages in using pressures in the range from 50 to 200 p.s.i., resulting in a greatly increased dielectric strength.

From the valve 234, the dielectric gas is supplied through a line 236 and a surge valve 238 to the line 84 (see also FIGURES 1 and 4) feeding into the interior of the portion of this cable in zone $T_1$. This gas also feeds through a line 242 and another surge valve 238 and a similar line 84 into the portion of the other cable lying in zone $T_1$.

These surge valves 238 allow the dielectric gas to feed slowly into the cable sheaths as desired. During increases in temperature, they allow the gases to expand and flow from the portions of the cables in zone $T_1$ to the control valve 234. However, upon any rapid flow of gas into the lines 84, such as from a punctured cable, these surge valves close and prevent loss of gas from the reservoir and other cable sections.

In order to temperature compensate these two portions of the cables in zone $T_1$, a compensation control, as shown schematically by the box 239, is provided. This compensation control includes a source of heater current, such as shown at 216 in FIGURE 17, and includes a pair of relays each operating as shown in FIGURE 17. A pair of conductor cables 241, including leads 208 and 210, connect each one of these relays to a pair of thermostatic switches. Each of these thermostatic switches is responsive to the interior temperature of one of the cable portions in zone $T_1$, as will be understood by reference to FIGURE 17. The compensation control thus controls the heater current fed through the conductor cables 66 and 68 (such as shown in FIGURE 1) to opposite ends of the resistance heaters 56 within the cables. The temperature within these portions of the cables are in this way automatically held closely to a predetermined value, which in this case is above $T_1$.

In zone $T_2$ the dielectric gas is controlled by the valve 234A and is held to a constant pressure as in zone $T_1$. In certain instances it is desirable to use a pressure in zone $T_2$ different from that in zone $T_1$. This gas is supplied through three similar surge valves 238 to three different gas circulation and heat exchange systems. These circulation systems automatically hold the temperature within three separate portions of the cables in zone $T_2$ to the same predetermined value as in zone $T_1$ in spite of the fact that the operating ambient temperature of zone $T_2$ is above this value.

A first one of these circulation systems includes a gas line 246 and a section 247 of the cable between a pair of gas-dead-ended connections 23. The gas returns from this section of cable through a temperature-sensing device 248 (which is a thermostatic switch), through a gas line 250, an impurity trap 252, through a heat exchanger 254, and is driven by a circulation pump 256 back through the line 246.

The trap 252 catches any impurities, such as any dissociation products of the dielectric gas or gases used. For example, where the gases include $CCl_2F_2$ or $SF_6$, suitable absorbers, such as activated alumina and soda lime, are used in the trap.

When the cable section 247 is being warmed up to the predetermined value prior to operation, heat is supplied by the heat exchanger 254 to the dielectric gas being circulated. This heat exchanger includes a cooling coil with provision for putting a heating medium or a cooling medium therein, as regulated by a compensation control indicated schematically in box form at 258.

When the ambient temperature in the zone $T_2$ has risen above the predetermined desired temperature within the cable section 247, the heat exchanger 254 cools the circulating gas.

The compensation control 258 includes a relay controlling a solenoid-operated valve in the heat exchanger, the relay being responsive to the thermostatic switch 248 as indicated schematically by the connection 260. Whenever the temperature of the gas returning through the temperature-sensing device 248 is below the predetermined desired value, the heat exchanger is conditioned for heating. When the gas temperature is above this value, the heat exchanger cools it.

The compensation control 258 is also made responsive to the temperature within the cable section 247 through a connection schematically illustrated at 262. A pair of thermostatic switches sense this interior temperature, being set at tolerable amounts above and below the predetermined value, respectively; for example, such as 25° F. above and 250° F. below. The pump 256 is operated whenever the differential in temperature between the interior of the cable and the returning gas exceeds this limit.

Thus, the temperature along the section of cable 247 is maintained substantially uniform to minimize Thomson voltages.

Similarly, gas is circulated through a section of cable 249 adjacent to the section 247 and is similarly controlled by the control 258A.

A longer section 251 of the other cable has gas circulated therethrough by a third circulation system and is also equipped with an electrical resistance element similar to those found on the cable sections in zone $T_1$. Both the circulation system and the electrical resistance element are automatically regulated by the control 259 which is a composite control performing a combination of the functions ascribed to controls 258 and 239 above.

Where the required amount of cooling is larger, I find it desirable to use shorter sections of cable, as shown at 247 and 249 to reduce any temperature differentials along the cable.

In power circuits where the primary concern is load carrying capacity, as discussed above, the heat exchangers and pumps are operated continuously to obtain maximum cooling effect.

As used herein, the term dielectric or inert gas or gaseous material is intended to include mixtures of two or more gases as well as a single gas.

Thus, by the methods and apparatus described all spurious thermoelectric voltages are advantageously minimized within tolerable limits. Operation of the electric circuits is freed from interference from these effects.

Now that methods and apparatus embodying the invention have been described fully, I would like to review certain further advantages of the invention and establish a broad meaning for the terms "ambient conditions" or "ambient" as applied to temperature herein. An important advantage of the methods and apparatus described results from the fact that they enable electrical conductors to be operated safely with current densities far, far in excess of those permitted in conventional insulated wires. A conductor of given size insulated as shown herein can be used to carry far greater current than when it is insulated with conventional insulation, or a much smaller lighter conductor can carry the same current as a conventionally insulated wire.

As explained above, the cable assemblies described are well adapted to operate with ambient temperatures up to 1500° F. In some instances, these temperatures may arise from heat entering the cable from outside. When compensation resistance elements such as 56, 56A or 156 are in operation, some or most of the temperature may result from the electrical energy purposely being dissipated in these resistance elements to maintain uniform temperatures in the cable. It is to be noted, however, that during operation, some or all of the conductors within the cable assembly are carrying electric power. Therefore, during operation heat is being generated by these conductors in use. In certain cases this conductor heat is used favorably to supplement the heat from the compensating heating resistance element in some or all parts of the circuit, depending upon ambient conditions. These cable assemblies advantageously withstand this internally generated heat just as well as heat from external sources. The inert gas maintained at least at sea level pressure provides convection action within the desirably unimpeded space around the conductors. Convection of this gas transfers heat from hotter parts to cooler parts, whether they be conductors or sheath, advantageously tending to maintain uniform temperature conditions through the cable. Also, heat is radiated from all of the conductors through the unimpeded inert gas to the sheath, and vice versa. This radiation aids the gas convection in tending to maintain uniform temperature. By virtue of its internal and external convoluted form the radiating and heat reflecting action of the sheath favorably tends to distribute the heat load more uniformly along its length. Any heat radiated from a hot spot along any conductor which is reflected internally by the sheath is dispersed longitudinally. There is no tendency to focus heat back on any hot spot. The sheath and outer braid itself conducts the heat along its length and away from hotter spots. Thus, the entire cable assembly in action has a desirably large capacity to absorb heat loads and to distribute them uniformly, regardless of whether the heat is from within or without.

In installations where the saving of weight and space is important, as in aircraft, the methods and apparatus described enable very much smaller conductors safely to be used for carrying a given current or a given size conductor to carry vastly larger currents. For example, let us consider an installation of the cable assembly of FIGURE 1 wherein all of the conductors therein are for the purpose of carrying electrical power. None are for instruments or sensitive control purposes. That is, we are now considering a cable assembly wherein its main purpose is to carry large amounts of power. Then there is no problem of compensation for thermoelectric effects. The insulation blanket 55 is omitted and the protective braid 59 tightly embraces the sheath. The compensation resistance element 56 is not used. The conductors in the cable assembly can safely carry such large currents that they heat up to 1500° F., that is, run red-hot.

This possibility of carrying vastly increased current densities can result in a reduction in conductor weight to a value one-half or one-fourth that with conventional wiring as known previously. And this saving in conductor weight and size is in addition to the saving in insulation weight described above.

A further advantage is that the pressurized inert gas maintains its conduction and convection action, carrying heat to the sheath, regardless of reduction in external pressure due to altitude. Thus, the current-carrying capacity of the cable assembly is practically not dependent on altitude. Conventional electrical installations must be sharply de-rated for altitude. This ability to avoid any substantial de-rating for altitude provides even a further larger saving in weight and size when compared with prior conventional electrical installations as used on craft for high altitude operation.

These savings in weight (1) from reduced insulation weight, (2) ability to operate red-hot, and (3) ability to avoid de-rating with altitude are compounded upon one another. The result is a very great saving in weight and size. As applied to transportation and craft in general, the result is an increase in performance and reliability. As applied to high speed high altitude aircraft, the resulting increase in performance and reliability are vast.

As used herein the term "ambient conditions" or "ambient" as applied to temperature includes heat from within and/or from without.

From the foregoing it will be understood that the embodiments of the present invention described above are well suited to provide the advantages set forth, and since many possible embodiments may be made of the various features of this invention and as the methods and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, or without departing from the scope of the invention.

I claim:

A multi-conductor electrical cable assembly adapted to operate under elevated temperature ambient conditions including an elongated gas-tight sheath of metal capable of withstanding elevated temperatures and resistant to corrosion at elevated temperatures, at least one bare conductor extending longitudinally within said sheath, a plurality of ceramic spacers within the sheath at spaced points along the length of said conductor supporting said conductor in insulating and spaced relationship from the sheath, and a shielded-wire assembly extending longitudinally within said sheath and supported by said spacers in insulating and spaced relationship from said bare conductor and from said sheath, said shielded-wire assembly including a tubular braid of wires, an inner conductor extending through said tubular braid, and a second plurality of ceramic spacers at spaced points along said inner conductor supporting it in insulating and spaced relationship from said braid.

References Cited in the file of this patent

UNITED STATES PATENTS

| | | |
|---|---|---|
| 680,150 | Hultman | Aug. 6, 1901 |
| 1,037,522 | Von Pindtershofen | Sept. 3, 1912 |
| 1,866,611 | Affel | July 12, 1932 |
| 2,014,853 | Ley et al. | Sept. 17, 1935 |
| 2,152,699 | Kuester et al. | Apr. 4, 1939 |
| 2,167,510 | Hobart | July 25, 1939 |
| 2,676,305 | Fondiller | Apr. 20, 1954 |
| 2,760,165 | Sullivan | Aug. 21, 1956 |
| 2,819,731 | Louthan | Jan. 14, 1958 |